United States Patent [19]
Sakui

[11] Patent Number: 6,043,949
[45] Date of Patent: Mar. 28, 2000

[54] ROTARY HEAD CLEANING APPARATUS AND METHOD OF CONTROLLING THE SAME

[75] Inventor: Masato Sakui, Nagaokakyo, Japan

[73] Assignee: Mitsubishi Denki Kabushiki Kaisha, Tokyo, Japan

[21] Appl. No.: 08/916,635

[22] Filed: Aug. 22, 1997

Related U.S. Application Data

[62] Division of application No. 08/509,657, Jul. 31, 1995, Pat. No. 5,701,224, which is a continuation of application No. 08/188,785, Jan. 31, 1994, abandoned.

[30] Foreign Application Priority Data

Feb. 3, 1993 [JP] Japan ..................................... 5-16085

[51] Int. Cl.$^7$ ................................................. G11B 15/18
[52] U.S. Cl. ............................... 360/69; 360/128; 360/53
[58] Field of Search ............................. 360/53, 128, 137, 360/69, 75, 84

[56] References Cited

U.S. PATENT DOCUMENTS

| | | | |
|---|---|---|---|
| 4,594,617 | 6/1986 | Tezuka | 360/73.03 |
| 4,704,647 | 11/1987 | Hino | 360/128 |
| 5,050,015 | 9/1991 | Hack et al. | 360/75 |
| 5,170,304 | 12/1992 | Katohno et al. | 360/128 |
| 5,193,033 | 3/1993 | Shimoi et al. | 360/31 |
| 5,253,126 | 10/1993 | Richmond | 360/53 |
| 5,309,307 | 5/1994 | Fritsch et al. | 360/128 |
| 5,341,257 | 8/1994 | Dienbauer | 360/85 |
| 5,420,729 | 5/1995 | Lee et al. | 360/128 X |
| 5,495,371 | 2/1996 | Munemoto et al. | 360/137 X |

FOREIGN PATENT DOCUMENTS

| | | |
|---|---|---|
| 2-281407 | 11/1990 | Japan . |
| 321873 | 1/1991 | Japan . |
| 3-259411 | 11/1991 | Japan . |
| 4-248110 | 9/1992 | Japan . |
| 562134 | 3/1993 | Japan . |

OTHER PUBLICATIONS

Patent Abstracts of Japan, vol. 16, No. 348, 04–105210, Magnetic Tape Device, Maruyama, Apr. 7, 1992.
"Magnetic Card Reader", by Tatsuo Fujii, Patent Abstracts of Japan vol. 15 No. 149 Apr. 15, 1991.

*Primary Examiner*—Andrew L. Sniezek

[57] ABSTRACT

A rotary head cleaning apparatus and method is disclosed, in which a control unit operates a cleaning mechanism based on time information from a clock that measures time-of-day. The rotary head cleaning apparatus can clean the head even during a lengthy recording or reproducing operation based on input from an operator as to either frequency of cleaning or actual times of cleaning.

12 Claims, 10 Drawing Sheets

ROTARY HEAD CLEANING APPARATUS AND METHOD OF CONTROLLING THE SAME

This application is a divisional of prior application Ser. No. 08/509,657 filed on Jul. 31, 1995 now U.S. Pat. No. 5,701,224 which is a Rule 62 Continuation of Ser. No. 08/188,785 filed on Jan. 31, 1994, ABN the entire contents of which are hereby incorporated by reference.

BACKGROUND OF THE INVENTION

1. Field of the Invention

The present invention relates to a rotary head cleaning apparatus for cleaning the rotary head mounted on the rotary drum such as a head for a magnetic recording and reproducing apparatus and to the magnetic recording-reproducing apparatus.

2. Description of Related Art

FIG. 1 is a perspective view showing a rotary drum and a video head cleaning mechanism for a conventional magnetic recording-reproducing apparatus. In this diagram, numeral 1 designates a rotary drum including a rotatable upper drum 1a and a lower drum 1b making up a lead for a tape guide. A head (not shown) is mounted on the peripheral surface of the upper drum 1a. Tape guides 3a, 3b are arranged at the tape outlet and the tape inlet, respectively, in the vicinity of the peripheral surface of the rotary drum 1. A cleaning roller 2 is mounted in the vicinity of the peripheral surface of the rotary drum 1 through an arm 4 coupled to the tape guide 3a at the tape outlet side. The cleaning roller 2, which constitutes a video head cleaning mechanism, is operatively interlocked with the tape guide 3a, and the tape guide 3a makes the peripheral surface of the roller come in contact with the peripheral surface of the rotary drum 1 at the tape outlet side in order to clean the head, as follows.

When the magnetic recording-reproducing apparatus loads the tape for a recording or reproduction operation or unloads the tape after a recording or reproducing operation, the cleaning roller 2 comes in contact with the rotary drum 1, thereby cleaning the head.

The aforementioned conventional video cleaning mechanism is adapted to clean the head only at the time of loading or unloading. During a continuous recording or reproduction for a long time, say, longer than 100 hours, however, the head, which may be contaminated in the process, cannot be cleaned. After a long recording or a long reproduction, a single cleaning operation could not clean off contaminations sufficiently. Nor is it possible to confirm whether the cleaning is sufficient or not.

SUMMARY OF THE INVENTION

The invention has been developed in order to solve the above-mentioned problem, and an object thereof is to provide a rotary head cleaning apparatus and a magnetic recording-reproducing apparatus capable of cleaning the head sufficiently even in the case of a long recording or reproducing. The rotary head cleaning apparatus or the magnetic recording-reproducing apparatus using the same cleaning apparatus according to the invention comprises a cleaning mechanism adapted to come in contact with the rotary drum for cleaning the head, a time setter for setting an arbitrary time, and a cleaning controller for operating the cleaning mechanism at the set time. The cleaning is therefore possible even during a long recording operation.

An alternative embodiment of the rotary head cleaning apparatus or the magnetic recording-reproducing apparatus using the same cleaning apparatus according to this aspect of the invention comprises a cleaning mechanism adapted to come into contact with a rotary drum for cleaning the head, a time setter for setting an arbitrary time interval, and a cleaning controller for operating the cleaning mechanism at set time intervals. As a result, the periodic cleaning is possible even during a long recording operation.

Another object of the invention is to provide a rotary head cleaning apparatus for keeping the head in satisfactory condition by cleaning the head of a magnetic recording-reproducing apparatus a multiplicity of times using the cleaning apparatus. The rotary head cleaning apparatus of the magnetic recording-reproducing apparatus according to the invention comprises a cleaning mechanism adapted to come in contact with the rotary drum for cleaning the head, a power cut-off determiner for deciding that power has been switched off for performing magnetic recording and/or magnetic reproducing function, and a cleaning controller for operating the cleaning mechanism when the decision is made that the power is cut off. The apparatus further comprises an arbitrary time interval setter, and a cleaning controller for operating the cleaning mechanism at set time intervals. As a result, the cleaning operation can be performed more often than can be done in the conventional apparatus, and the cleaning mechanism is operated when a power cut-off is decided, thereby permitting subsequent periodic cleaning operations. Also, the rotary head cleaning apparatus or the magnetic recording-reproducing apparatus using the same cleaning apparatus according to still another aspect of the invention comprises a cleaning mechanism adapted to come in contact with the rotary drum for cleaning the head, a connection determiner for deciding that power for performing the magnetic recording and/or magnetic reproducing function is connected, and a cleaning controller for operating the cleaning mechanism when the connection determiner decides that power is connected. In addition, the apparatus according to the invention comprises an arbitrary time interval setter, and a cleaning controller for operating the cleaning mechanism at set time intervals. As a consequence, more cleaning operations can be performed than in the prior art, and the cleaning mechanism can be activated upon decision of a power connection, thereby to perform subsequent periodic cleaning operations.

The rotary head cleaning apparatus or the magnetic recording-reproducing apparatus according to a further aspect of the invention comprises a cleaning mechanism for cleaning the head, a recording reservation setter for setting the reservation of the recording time, and cleaning controller for operating the cleaning mechanism when the present time is a non-reservation time, i.e., not within a reservation time zone. In addition, the apparatus comprises an arbitrary time interval setter, and a cleaning controller for operating the cleaning mechanism at set time intervals. As a result, more cleaning operations can be performed than in the prior art, and the cleaning mechanism is operated when the present time is in the non-reservation time zone to perform subsequent periodic cleaning operations.

Still another object of the invention is to provide a magnetic recording-reproducing apparatus in which, after the head is cleaned, it is judged whether the head is sufficiently cleaned, thereby to keep the head always in a well-cleaned condition. The magnetic recording-reproducing apparatus according to the invention comprises a head mounted on the rotary drum, a signal processing circuit for processing signals to record and/or reproduce an object signal, a cleaning mechanism adapted to come in contact with the rotary drum for cleaning the head, a cleaning judgement circuit for reproducing the object signal, recorded after the cleaning operation, and judging the cleaning condition, and a cleaning controller for reactivating the cleaning mechanism in the case where an insufficient cleaning condition is judged. As a result, the head is kept in an always satisfactorily-cleaned condition.

The above and further objects and features of the invention will more fully be apparent from the following detailed description and accompanying drawings.

DESCRIPTION OF THE PREFERRED EMBODIMENTS

The invention is described below with reference to the drawings showing embodiments thereof.
Embodiment 1

Figure 1:
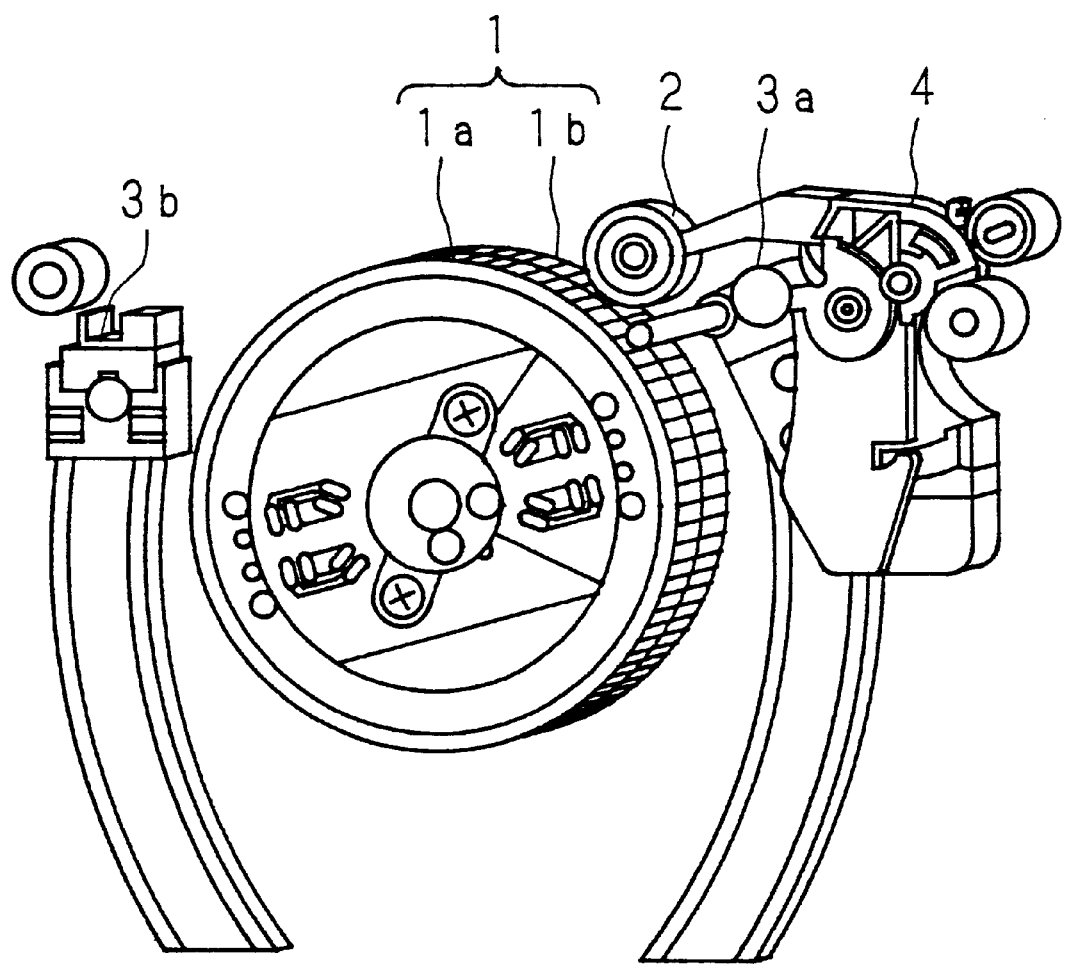
FIG. 1 is a perspective view showing a rotary drum and a video head cleaning mechanism of a conventional magnetic recording-reproducing apparatus.
Figure 2:
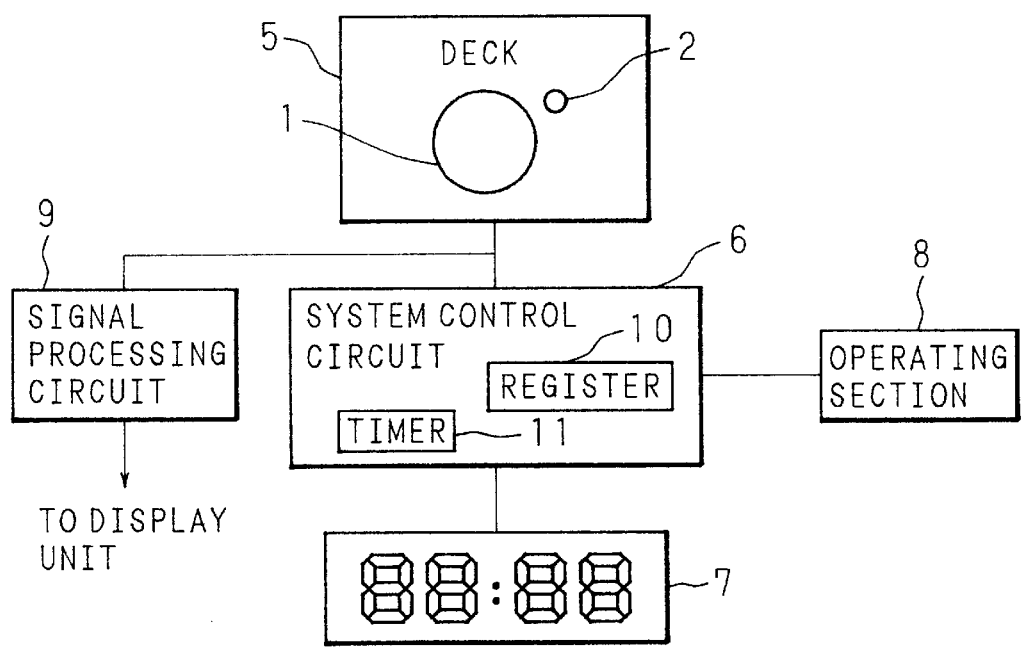
FIG. 2 is a schematic block diagram showing a configuration of a magnetic recording-reproducing apparatus according to a first embodiment of the invention.

FIG. 2 is a schematic block diagram showing a configuration of a magnetic recording-reproducing apparatus comprising a video head cleaning apparatus according to the first embodiment of the invention. In the diagram, numeral 5 designates a deck of the magnetic recording-reproducing apparatus. The deck 5 includes a rotary drum 1 carrying a head and a plurality of tape guides (not shown). The rotary drum 1 and the tape guides have a configuration similar to that of the conventional apparatus shown in FIG. 1. The video signal inputted to the signal processing circuit 9 is modulated at the signal processing circuit 9 and outputted to and recorded by the recording head of the deck 5. Also, the signal reproduced at the recording head is inputted to and demodulated at the signal processing circuit 9, so that a demodulated signal is outputted to a display unit.

A cleaning roller 2 is arranged in the vicinity of the peripheral surface of the rotary drum 1. The peripheral surface of the cleaning roller 2 comes in contact with the peripheral surface of the rotary drum 1, thereby to clean the head. This cleaning operation is performed independently of the tape guides. The system control circuit 6 including a microcomputer, together with the cleaning roller 2, makes up a video head cleaning apparatus. This system control circuit 6 includes a timer 11 for measuring the time and a register 10. A signal inputted to an operating section 8 is stored in a register 10, and a signal for controlling the cleaning operation is outputted to the deck 5. The operating section 8 includes input keys for ordering the recording and reproducing of video signals, input keys for ordering the time intervals for head cleaning operations, and input keys for specifying the time for head cleaning operations. The signal from the timer 11 is outputted to a time display unit 7 for making a time-related display.

In the magnetic recording-reproducing apparatus described above, the user gives a signal for recording or reproducing the video signal to the deck 5 through the system control circuit 6 by way of the operating section 8. At this time, the head is supplied with the video signal that has been processed at the signal processing circuit 9, and the video signal is recorded or reproduced by the head. Also, the user, by way of the operating section 8, inputs a signal for a cleaning operation to the system control circuit 6. As a result, the system control circuit 6 performs the operations described below, thereby enabling the cleaning roller 2 to clean the head.

Figure 3:
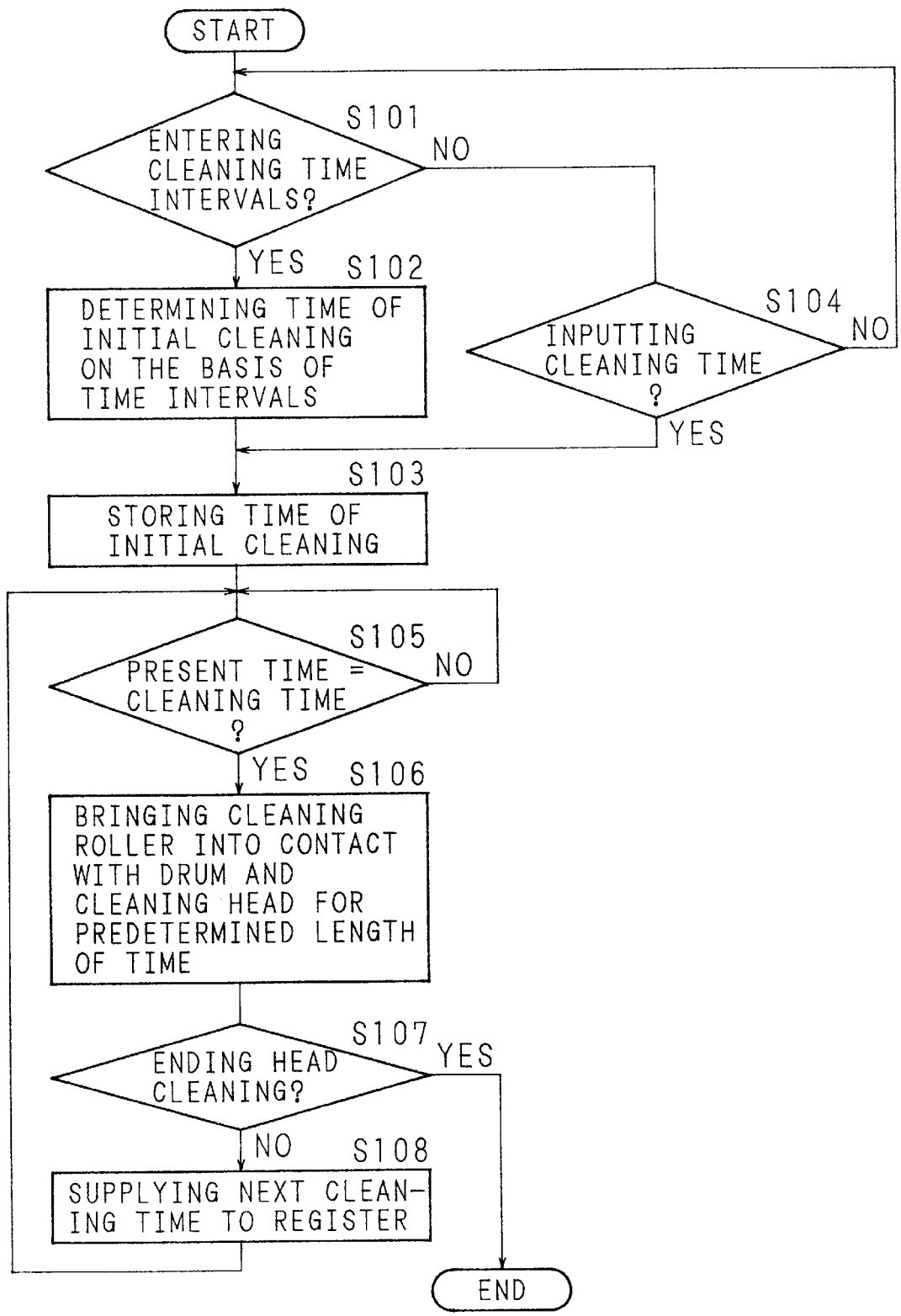
FIG. 3 is a flowchart for explaining the head cleaning operation in a system control circuit according to the first embodiment.

FIG. 3 is a flowchart for explaining the procedure for the head cleaning control operation in the system control circuit 6. In the case where the user sets a desired cleaning time or time intervals by the use of the operating section 8, the signal is inputted to the system control circuit 6 to thereby decide whether the cleaning time intervals have been inputted (step S101). When the cleaning time intervals are inputted, the time of initial cleaning is determined on the basis of the time intervals thus inputted (step S102), and the particular time is inputted to and stored in the register 10 (step S103). When the cleaning time intervals are not inputted at step S101, on the other hand, decision is made as to whether the cleaning time has been inputted (step S104). When the cleaning time is inputted, the particular cleaning time is stored in the register 10 (step S103). Otherwise, step S101 and step S104 are repeated until the cleaning time intervals or the cleaning time is inputted.

Coincidence or non-coincidence between the present time based on the timer 11 and the cleaning time is decided (step S105), and in case of non-coincidence, the same decision operation is repeated until coincidence is reached. At the time coincidence is reached, the cleaning roller 2 is brought into contact with the drum 1 and after performing the head cleaning operation for a predetermined length of time, a signal for restoring the cleaning roller 2 into the original position is inputted to the deck 5 (step S106). Whether a signal for ending the head cleaning operation has been inputted to the operating section 8 is decided (step S107), and if it has been so inputted, the cleaning control operation is terminated. If the signal has not yet been inputted, the next cleaning time is calculated and then stored in the register 10 (step S108). Whether the present time based on the timer 11 and the cleaning time coincide with each other is then decided (step S105). At a time point of coincidence, the deck 5 is supplied with a signal for causing the cleaning roller 2 to come in contact with the drum 1 (step S106). This routine is then repeated.

In the video head cleaning apparatus having a configuration described above, the head is cleaned at the desired time intervals or at the desired time of the day. Thus even in case of long recording or reproducing, the head can be cleaned a multiplicity of times.

Although the video head cleaned according to the first embodiment is for recording or reproducing video signals, the invention is not limited to such a head but is applicable to a head dedicated to either the recording or the reproduction of a video signal with equal effect.

Embodiment 2

The configuration of the magnetic recording-reproducing apparatus according to a second embodiment of the invention is the same as that shown in FIG. 2 except that the second embodiment includes input keys for ordering the turning on and off of a power supply for the system control circuit 6 and the operating section 8. The procedure for the operation of the system control circuit 6 will be described below, while omitting the description of the other parts.

Figure 4:
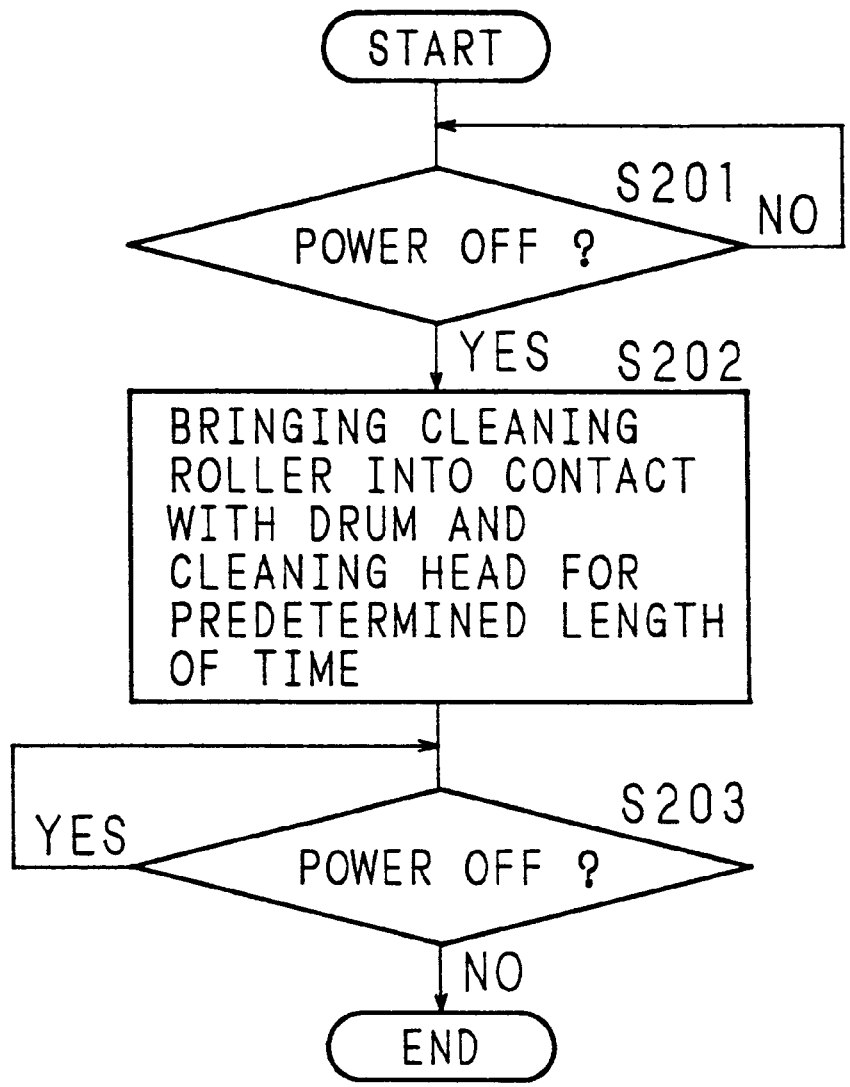
FIG. 4 is a flowchart for explaining the head cleaning operation in a system control circuit according to a second embodiment.

FIG. 4 is a flowchart for explaining the procedure for the head cleaning control operation in the system control circuit 6 of the magnetic recording-reproducing apparatus according to the second embodiment of the invention. At first, the system control circuit 6 decides whether the power supply for recording or reproducing on the head is off (step S201). In accordance with the signal inputted by the operation of the input keys for ordering the turning on/off of the power supply, the system control circuit 6 outputs a signal for turning on/off the power supply to the deck 5, thereby controlling the power supply for recording or reproducing on the head. Whether or not the power supply is off is decided by detecting a signal produced from the operating section 8 or a signal outputted from the system control circuit 6.

This decision is repeated until the power supply for recording or reproducing on the head, which may be in an on state, turns off. At the time point when the power turns off, a signal is given to the deck 5 so that the cleaning drum 2 is brought into contact with the drum 1 to thereby clean the head for a predetermined time length (step S202). After the cleaning operation is completed, it is decided whether the power supply for recording or reproducing on the head is in an off state (step S203). In the case where the power supply is off, the decision is repeated until the power turns on. When the power turns on, the cleaning control operation is terminated.

Although the video head cleaning operation according to the second embodiment of the invention is performed on a head for both recording and reproducing the video signal, the invention is not limited to such applications, but is equally applicable to the cleaning of a head capable of only recording or reproducing a video signal.

Embodiment 3

Figure 5:
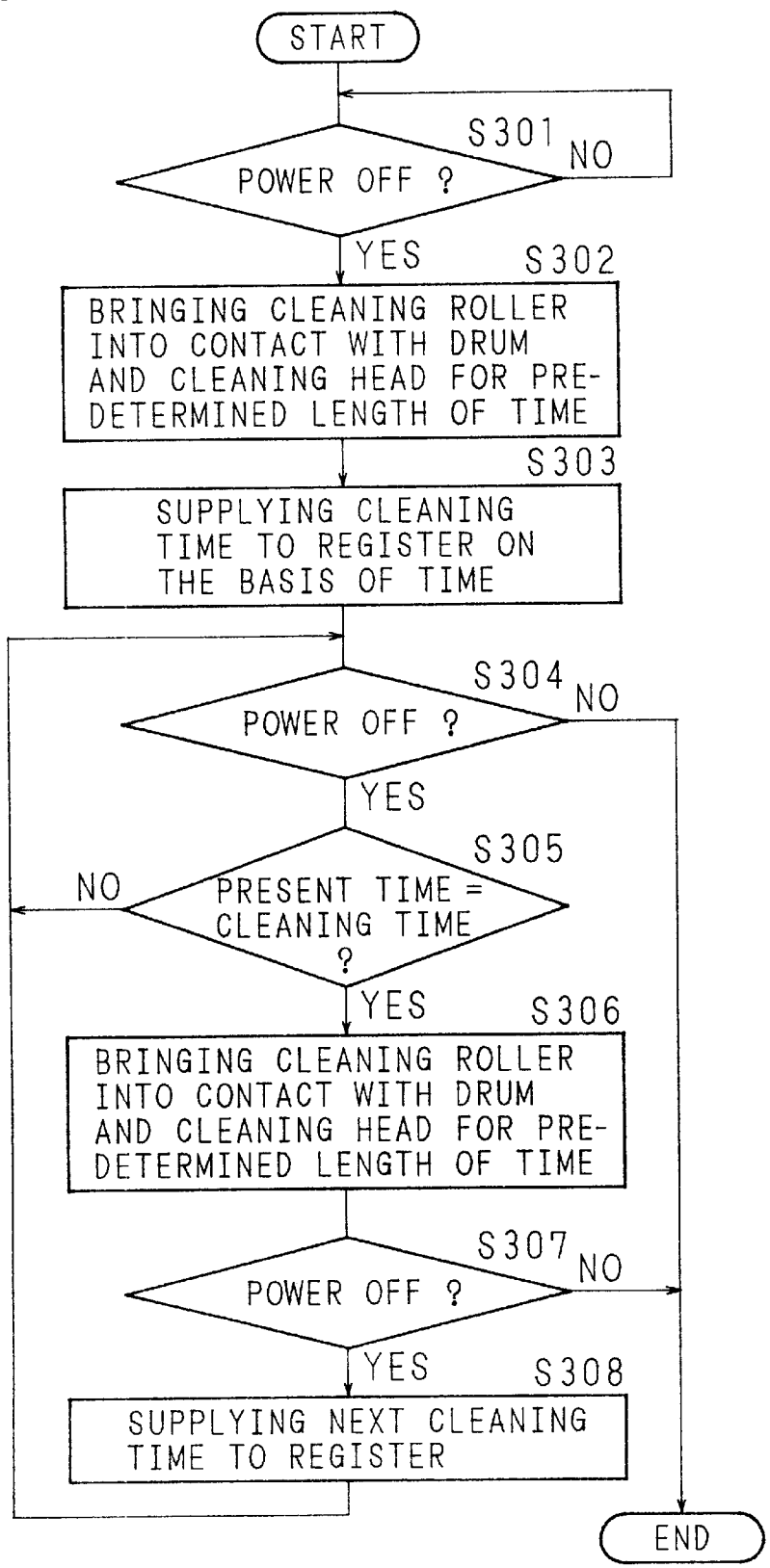
FIG. 5 is a flowchart for explaining the head cleaning operation in a system control circuit according to a third embodiment.

Embodiment 2, described above, involves the case in which the head is cleaned once when the power supply for head recording or reproducing is off. According to the third embodiment, however, the head is cleaned at set time intervals while the supply for head recording reproducing power is off, thereby permitting a greater number of times of cleaning. FIG. 5 is a flowchart for explaining the procedure of the cleaning control processing at the system control 6 described above. The apparatus according to the invention is similar to that of the second embodiment except that the operating section 8 of the magnetic recording-reproducing apparatus has input keys for ordering the turning on or off of the power supply for head recording or reproducing. The remaining configurations are similar to those of the second embodiment and will not be described.

At first, the operating section 8 inputs the desired time intervals by way of input key operation for inputting the cleaning timing intervals set in the operating section 8. It is thus decided whether the power supply for a head recording or reproducing operation is off (step S301). In the case where the power supply is not off, the decision is repeated until the power is off. When the power supply turns off, a signal is inputted to the deck 5, so that the cleaning roller 2 is brought into contact with the drum 1 to thereby clean the head for a pre-set time length (step S302). In the process, the next cleaning time is determined and inputted to the register 10 on the basis of the set cleaning time intervals (step S303). After the cleaning is completed, it is decided whether the power supply is off (step S304). In the case where the power supply is not off, the operation is ended. When the power for head recording or reproducing is off, it is decided whether the present time outputted from the timer 11 and the cleaning time coincide with each other (step S305). In the case where no coincidence is reached, the decision at steps S304 and S305 are repeated until coincidence is reached. At the time of coincidence, a signal is given to the deck 5, and, with the cleaning roller 2 brought into contact with the drum 1, the head is cleaned for a pre-set time length (step S306). After completion of the pre-set duration of cleaning, whether the power supply is off is decided (step S307). If the power supply is not off, the operation is ended. If the power supply is off, the next cleaning time is determined and given to the register 10 (step S308). The process is returned to step S304 and it is decided whether the power is off. This routine is then repeated.

The head is cleaned by a video head cleaning apparatus having a configuration as described above whereby, even in case of long recording or reproducing operation, a greater number of head cleaning operations can be performed than in the second embodiment, thereby providing sufficient means for coping with a stubborn contamination.

Although the video head cleaning according to third embodiment concerns a head for both recording and reproducing the video signal, the invention is not confined to such an application but is also applicable to the cleaning of a head dedicated to only recording or reproducing of the video signal, with equal effect.

Embodiment 4

The configuration of the magnetic recording-reproducing apparatus according to the fourth embodiment of the invention is similar to that shown in FIG. 2 except that there are provided input keys for giving an order for the turning on/off of the power supply to the system control circuit 6 and the operating section 8. The procedure for the control operation of the system control circuit 6 will thus be described below while description of the other component parts will be omitted.

Figure 6:
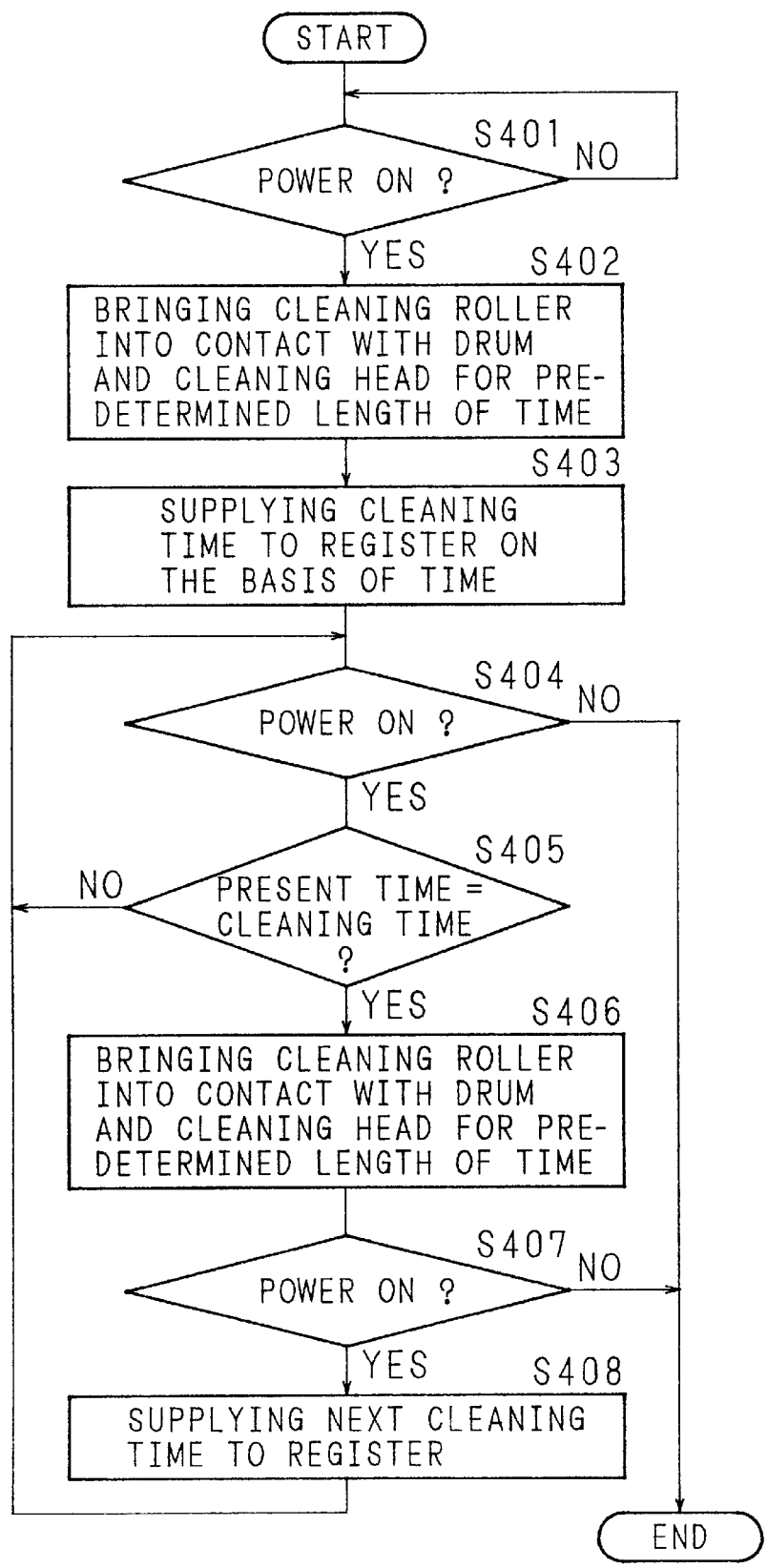
FIG. 6 is a flowchart for explaining the head cleaning operation in a system control circuit according to a fourth embodiment.

A flowchart for explaining the procedure for the head cleaning control operation in the system control circuit 6 of the magnetic recording-reproducing apparatus according to the fourth embodiment is shown in FIG. 6. At first, the user inputs the desired cleaning time intervals by way of an input key operation to input the cleaning time intervals set in the operating section 8, thereby deciding whether the power supply for a head recording/reproducing operation is on (step S401). In the case where the power supply is not on, the decision is repeated until the power supply is on. At the time when the power supply turns on, a signal is given to the deck 5, whereupon the cleaning roller 2 is brought into contact with the drum 1 to thereby clean the head for a predetermined length of time (step S402). On the basis of the cleaning time intervals thus set, the next cleaning time is calculated and inputted to the register 10 (step S403). After complete cleaning, it is decided whether the power supply is on (step S404). When the power is not on, the operation is terminated. When the power supply is on, it is decided that the present time, based on the timer 11, and the cleaning time are coincident with each other (step S405). In case of non-coincidence, the decisions at step S404 and S405 are repeated until a coincidence is reached. At the time of coincidence, a signal is inputted to the deck 5 so that the cleaning roller 2 is brought into contact with the drum 1 to thereby clean the head for a predetermined time length (step S406). After the cleaning is completed, it is decided whether the power supply is on (step S407). If the power supply is not on, the operation is terminated. If the power supply is on, the next cleaning time is determined and inputted to the register 10 (step S408). The process is then returned to step S404, where it is decided whether the power supply is on, to thereby repeat the routine.

Thus, the head is cleaned by a video head cleaning apparatus constructed as described above, whereby a multiplicity of head cleaning operations are possible even during a long time recording or reproducing operation.

Although the foregoing description presupposes that the video head cleaning operation according to the fourth embodiment involves a head for both recording and reproducing the video signal, the invention is not limited to such an application, but is equally applicable to the cleaning of a head dedicated to only recording or reproducing a video signal.

Embodiment 5

The magnetic recording-reproducing apparatus according to the fifth embodiment of the invention is constructed in the same way as the apparatus shown in FIG. 2, except that embodiment 5 further comprises a system control circuit 6 and input keys included in the operating section 8 for inputting a time slot for record reservation. The procedure for the control operation of the system control circuit 6 is described below, while the description of the other components will be omitted.

Figure 7:
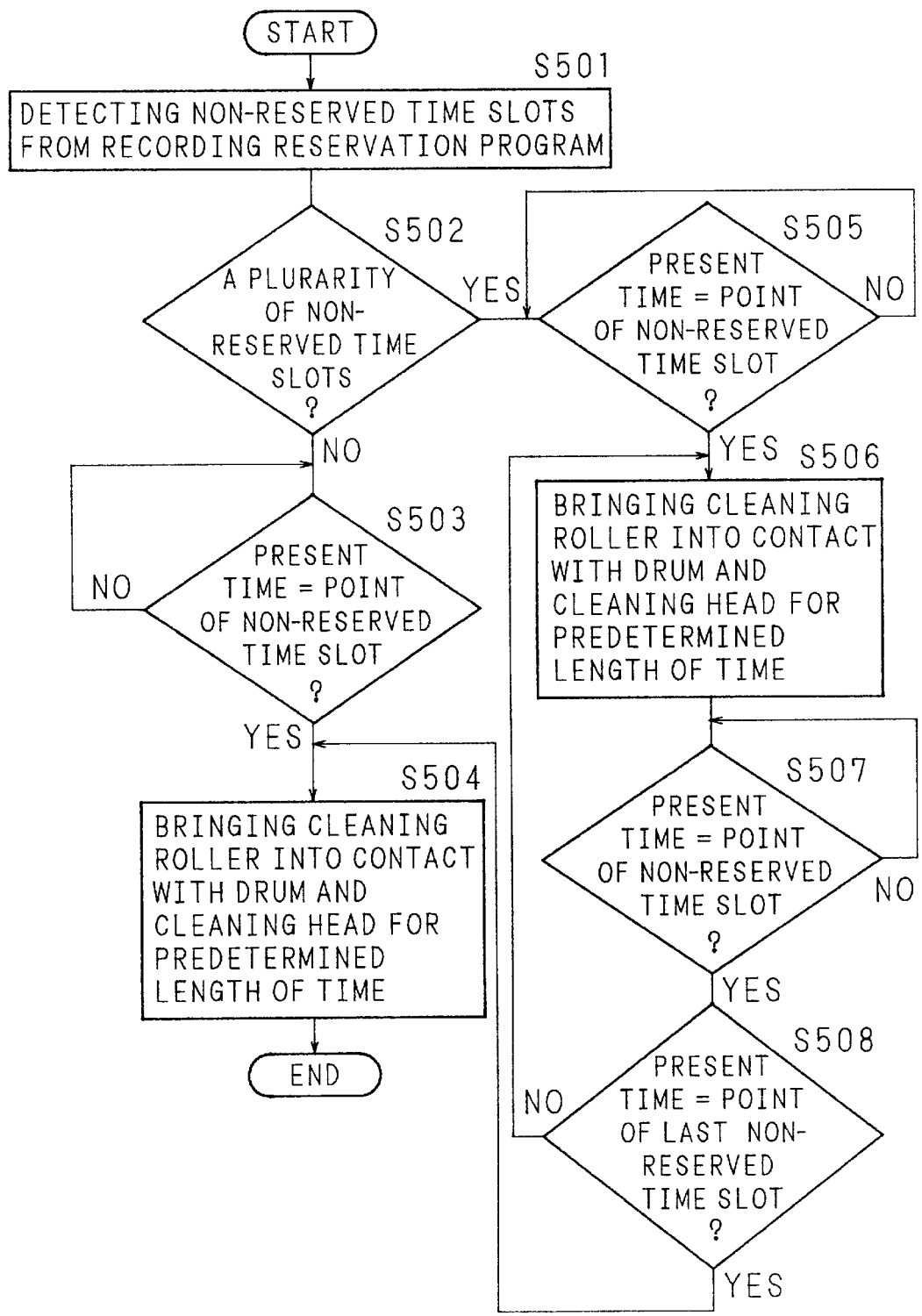
FIG. 7 is a flowchart for explaining the head cleaning operation in a system control circuit according to a fifth embodiment.

FIG. 7 is a flowchart for explaining the procedure for a head cleaning control operation in the system control circuit 6 of the magnetic recording-reproducing apparatus according to the fifth embodiment of the invention. First, the user sets the desired recording reservation time slot by operating the input keys for recording the reservation on the operating section 8. By so doing, a corresponding signal is inputted to the system control circuit 6 to thereby prepare a recording reservation program containing the reserved starting time and finish time. The system control circuit 6 detects one or more non-reserved time slots from the recording reservation program (step S501). The non-reserved time slot is defined as a time slot between a plurality of recording reservation time slots or the time slot after the finish time of the final recording reservation time slot. As a result of detecting a non-reserved time slot, it is decided whether a plurality of non-reserved time slots are involved (step S502).

In the case where a plurality of the non-reserved time slots are not involved, i.e., there is but one non-reserved slot, a predetermined time point of the particular non-reserved time slot is determined, and it is decided whether the predetermined time point and the present time from the timer 11 coincide with each other (step S503). According to the embodiment, the predetermined time point of the non-reserved time slot is set at the initial time point of the non-reserved time slot. This predetermined time point may alternatively be the one when a pre-set time passes in the non-reserved time slot. In case of non-coincidence between the predetermined time point and the present time, the same decision is repeated until coincidence is reached. Upon coincidence, a signal is inputted to the deck 5, so that the cleaning roller 2 is brought into contact with the drum 1 to thereby clean the head for a predetermined length of time (step S504). After cleaning is completed, the cleaning control operation is terminated.

In the case where it is decided at step S502 that there are involved a plurality of non-reserved time slots, a plurality of predetermined time points are determined in the particular non-reserved time slots, and it is decided whether these predetermined time points coincide with the present time based on the timer 11 (step S505). In case of non-coincidence the same decision is repeated until coincidence is reached. When coincidence is obtained, a signal is inputted to the deck 5 so that the cleaning roller 2 is brought into contact with the drum 1 to thereby clean the head for a predetermined length of time (step S506). After cleaning is completed, it is decided again whether the present time and the predetermined time point coincide with each other (step S507). The decision loop is repeated until such time as a coincidence is reached. Upon coincidence, decision is made as to whether the non-reserved time slot involved is the last one detected (step S508). In the case where the detected non-reserved time slot is not the last one, the process returns to step S506, where a similar operation is continued. When the detected non-reserved time slot is the last one, on the other hand, the head is cleaned in step S504, thus completing the cleaning control operation.

By cleaning the head on a video head cleaning apparatus constructed as described above, it is possible to clean the head a multiplicity of times even during the execution of a recording reservation.

Although the fifth embodiment concerns the cleaning of a head for both recording and reproducing a video signal, the invention is not limited to such an application, but covers also a head used exclusively for either video signal recording or reproducing.

Embodiment 6

The above-described fifth embodiment of the invention is a case in which the head is cleaned once during the non-reserved time slot. According to the sixth embodiment of the invention, by contrast, the head is cleaned by the system control circuit 6 at set time intervals during a given non-reserved time slot. This permits an even greater multiplicity of cleaning operations. The operating section 8 of the magnetic recording-reproducing apparatus includes input keys for inputting the time slot for recording reservation, the description of the other component parts being omitted as they are the same as in the second embodiment.

Figure 8:
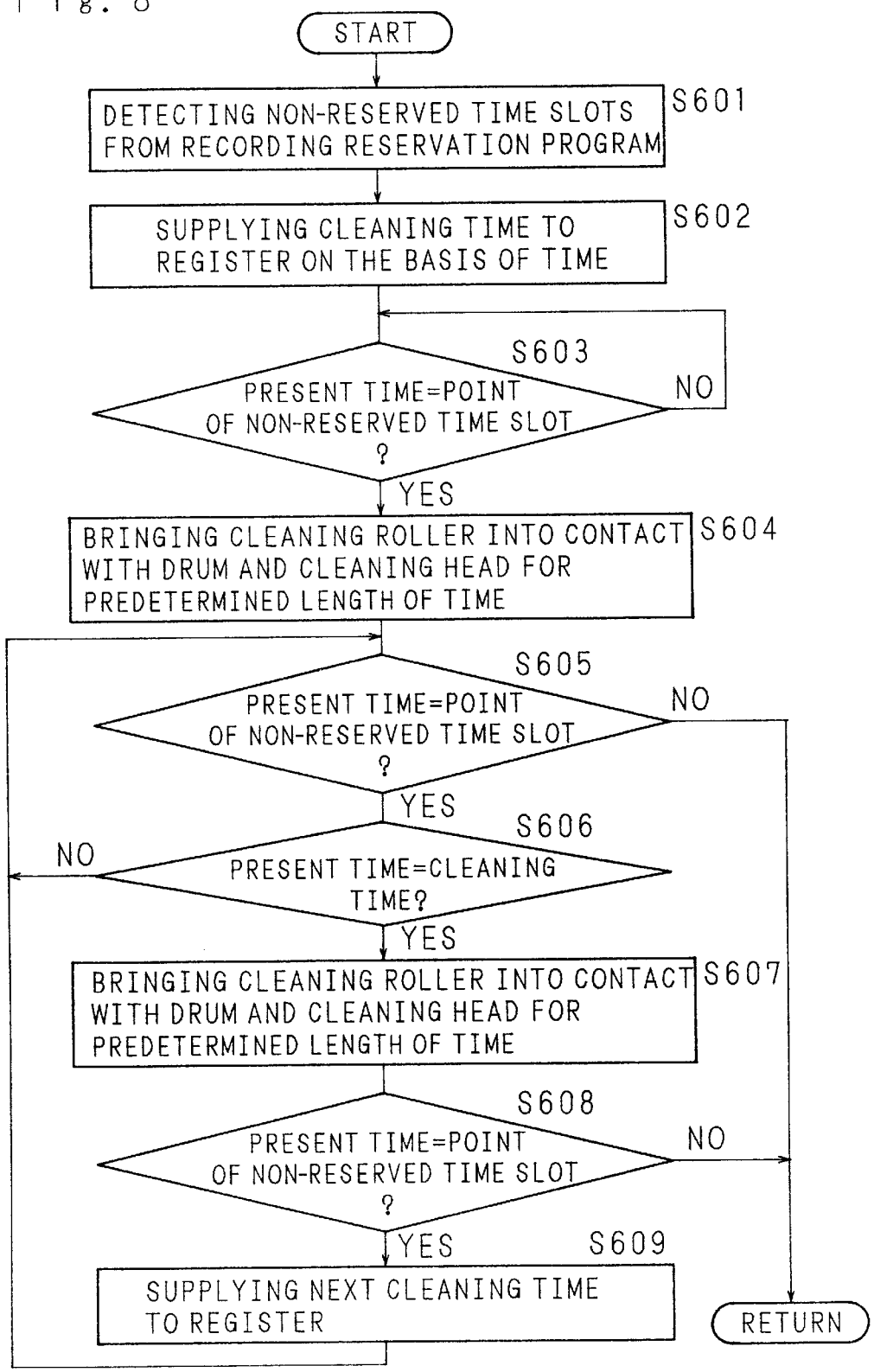
FIG. 8 is a flowchart for explaining the head cleaning operation in a system control circuit according to a sixth embodiment.

FIG. 8 is a flowchart for explaining the procedure for head cleaning operation of the system control 6. The operating section 8 includes input keys for inputting the starting time and finish time of the recording reservation time and input keys for inputting the cleaning time intervals. At first, the user operates the input keys for setting the desired recording reservation time slot and the desired cleaning time intervals.

On the basis of the recording reservation time thus inputted, a recording reservation program is set, from which a non-reserved time slot is detected (step S601), and the cleaning time is determined from the set cleaning time intervals (step S602). Decision is made as to whether a predetermined time point of the non-reserved time slot coincides with the present time based on the timer 11 (step S608). In case of non-coincidence, the decision step is repeated until coincidence is reached. Upon coincidence, a signal is inputted to the deck 5 so that the cleaning roller 2 is brought into contact with the drum 1 to thereby clean the head for a predetermined length of time (step S604). In addition, the predetermined time point of the non-reserved time slot may alternatively be the time point when a pre-set time of the non-reserved time slot has passed.

After completion of cleaning, it is decided whether the present time is still within the non-reserved time slot (step S605) and, when it is not within the non-reserved time slot, the cleaning control operation based on the set time intervals is terminated. If within the non-reserved time slot, decision is made as to whether the present time coincides with the cleaning time (step S606). In case of non-coincidence, the decision at step S605 and step S606 are repeated until coincidence is reached. At the time point of coincidence, a signal is inputted to the deck 5, and the cleaning roller 2 is brought into contact with the drum 1 to thereby clean the head for a pre-determined length of time (S607). After successful completion of cleaning, the decision is made as to whether the present time is still within the non-reserved time slot (step S608). If not within the non-reserved time slot, the operation is completed. If the present time is within the non-reserved time slot, the next cleaning time is determined and inputted to the register 10 (step S609). The process is then returned to step S605 for deciding whether the present time is still within the non-reserved time slot. This routine is repeated.

By cleaning the head on a video head cleaning apparatus constructed as described above, more head cleaning operations are made possible than in the fifth embodiment even during the execution of a reserved time slot.

Although the video head cleaning operation according to the sixth embodiment concerns the cleaning of a head for both recording and reproducing a video signal, the invention is not confined to such a case, but it is also applicable to the cleaning of a head exclusive for recording or reproducing of video signal.

Embodiment 7

Figure 9:
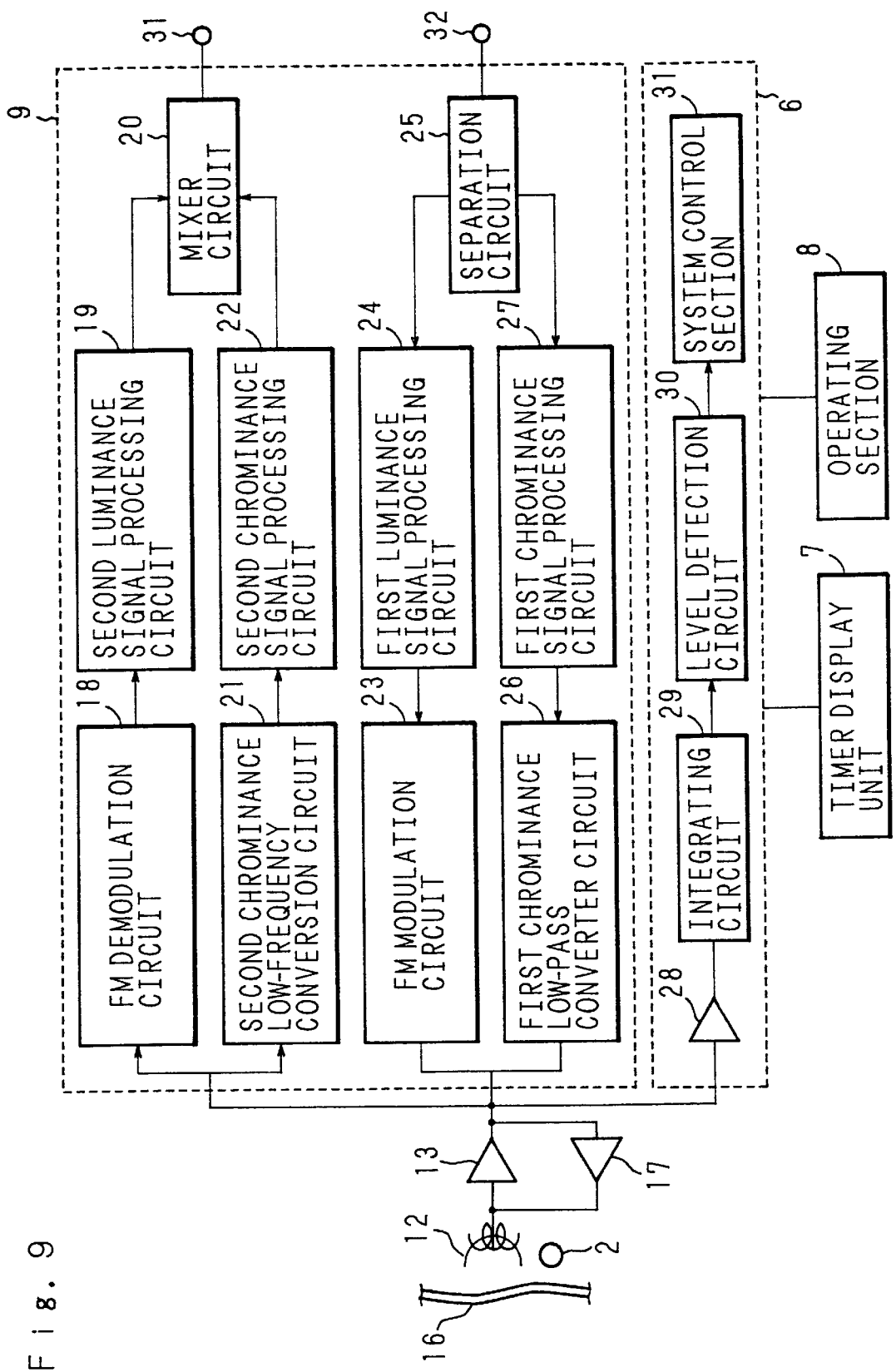
FIG. 9 is a block diagram showing a configuration of a magnetic recording-reproducing apparatus according to a seventh embodiment.

FIG. 9 is a block diagram showing the configuration of a magnetic recording-reproducing apparatus according to a seventh embodiment of the invention. The configuration of this magnetic recording-reproducing apparatus is similar to that of FIG. 2, except that the embodiment further comprises a signal processing circuit 9, a system control circuit 6, input keys for ordering the cleaning to the operating section 8 and input keys for setting the maximum number of cleaning operations. FIG. 9 shows the signal processing circuit 9 and the system control circuit 6 in detail.

In the diagram, numeral 9 designated the signal processing circuit. This circuit is for appropriately processing the input video signal to record it in the magnetic tape 16 on the one hand, and for reproducing the recorded signal and processing the same signal to display it on the display unit on the other. At first, a specific configuration of the signal processing circuit 9 will be explained.

The video signal is inputted from an input terminal 32 to the signal processing circuit 9, wherein it is inputted at first to a separation circuit 25 to be separated into a luminance signal and a chrominance signal. The luminance signal thus separated is inputted to an FM modulation circuit 23 through a first luminance signal processing circuit 24, where it is FM-modulated. The chrominance signal, on the other hand, is then inputted through a first chrominance signal processing circuit 27 to a first chrominance low-pass converter circuit 26 for conversion into a low frequency signal. The FM-modulated luminance signal is synthesized with the chrominance signal after the latter signal is converted into a low-frequency signal. The combined signal is outputted from the signal processing circuit 9, supplied to the head 12 through a recording amplifier 17 and recorded in the magnetic tape 16.

Also, the signal recorded in the magnetic tape 16 is reproduced by the head 12, amplified at a head amplifier 13, and inputted to an FM demodulation circuit of the signal processing circuit 9 and a second chrominance low-frequency conversion circuit 21. In the FM demodulation circuit 18, the FM luminance signal is demodulated into a luminance signal. In the second chrominance low-frequency converter circuit 21, the chrominance signal of 629 kHz±500 kHz is restored into a signal of 3.58 Mhz±500 MHz. These values are for the case of NTSC television broadcasting as in America. In the case of PAL broadcasting as in Europe, the signal is restored into a signal of 4.43 MHz±500 MHz. The luminance signal is inputted to the second luminance signal processing circuit 19. The chrominance signal, which is inputted to the second chrominance signal processing circuit 22, on the other hand, is subjected to various processings including changing frequency characteristics, level conversion and noise reduction, after which the two signals are inputted to a mixer circuit 20 where the luminance signal and the chrominance signal are synthesized. The video signal thus synthesized is produced from the signal processing circuit 9 through the output terminal 31 and is inputted to a display unit.

Next, a configuration of the system control circuit 6 will be explained. The signal reproduced by the head 12 and outputting from the head amplifier 13 is inputted to a signal processing circuit 9 as described above, while at the same time being inputted to an amplifier circuit 28 and then to an integrating circuit 29. The integrating circuit 29 integrates the inputted signal for converting the output amplitude from the head 12 into a voltage. The voltage thus converted is inputted to a level detection circuit 30, where the output value from the head 12 is detected and inputted to the system control section 31. The system control section 31 decides whether the cleaning of the head 12 is necessary on the basis of the detected value.

Figure 10:
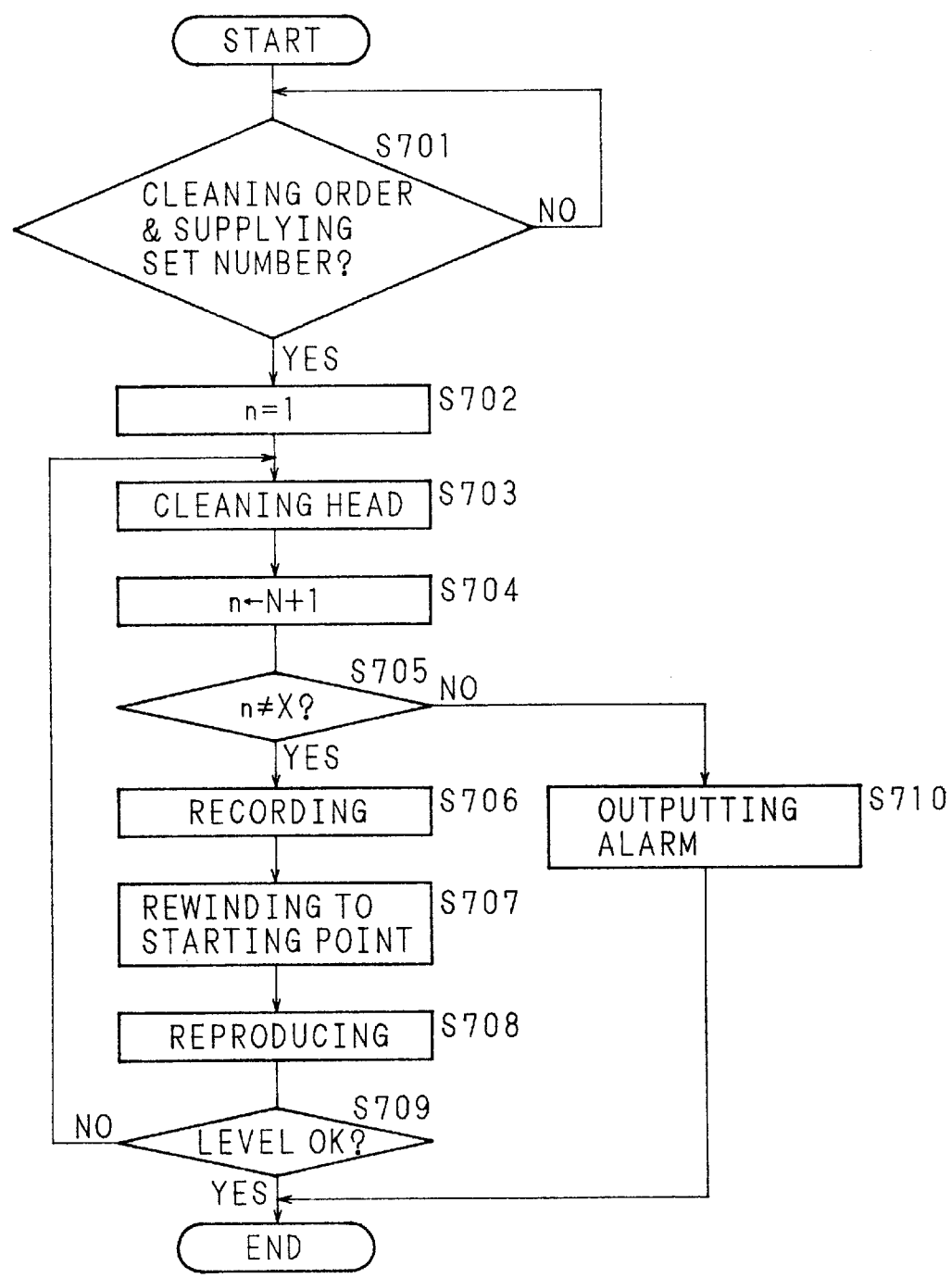
FIG. 10 is a flowchart for explaining the head cleaning operation in a system control circuit according to the seventh embodiment.

The procedure for cleaning control operation by the system control circuit 6 in cleaning the head 12 using the magnetic recording-reproducing apparatus constructed as described above will be explained on the basis of the flowchart of FIG. 10. The user operates the input keys for ordering the cleaning operation and for setting the upper limit of the number of cleaning operations on the operating section 8. Decision is made as to whether a signal representing the cleaning order for the head 12 and the set number (X) has been inputted to the system control circuit 6 (step S701). When such a signal has not been inputted, the same decision loop is repeated until the signal is inputted. When the signal is inputted, the number of cleaning operations (n) is set to an initial value (N=1) (step S702). A cleaning order signal is inputted to the deck 5, and the cleaning roller 2 is brought into contact with the drum 1 to thereby clean the head for a predetermined length of time (step S703). After the predetermined length of cleaning, the number of times (n) is counted up to (N+1) (step S704), thereby deciding whether the set number (n) has reached the number of times (X) (step S705).

When the number (n) has not yet reached the set number (X), the video signal inputted to the signal processing circuit 9 is recorded in the magnetic tape 16 for a predetermined length of time (step S706). After recording, the magnetic tape 16 is rewound to the record starting point (step S707), and the recorded signal is reproduced (step S708).

The reproduced signal is inputted to the integrating circuit 29 and the level detection circuit 30 for detecting the signal level. The system control section 31 decides whether the reproduced signal is higher than a predetermined level (step S709). When the reproduced signal is higher than the predetermined level it is decided that the head 12 has been cleaned sufficiently, thus completing the cleaning control operation. When the reproduced signal is lower than the predetermined level, by contrast, decision is made that the cleaning of the head 12 is insufficient, so that the process returns to step S703 wherein the head is cleaned again followed by repetition of similar operations.

Also, when it is decided in step S705 that the number (n) has reached the set number (X), an external alarm signal is outputted (step S710).

With the video head cleaning apparatus as constructed above, it is possible to confirm whether the cleaning of the head is sufficient.

The invention is not limited to the embodiment relating to the cleaning of a video head, but is also applicable to the cleaning of a head mounted on a rotary drum of an apparatus handling an audio signal such as a DAT (Digital Audio Tape) recorder. In applying the seventh embodiment to a DAT, an audio signal is used as a signal for recording/reproducing for the purpose of confirming the cleaning condition.

It will thus be understood from the foregoing description that, in a rotary head cleaning apparatus and a magnetic recording-reproducing apparatus using such a cleaning apparatus according to the invention, a cleaning mechanism is driven at a set time or at set time intervals, and therefore the head can be cleaned periodically even during a lengthy recording operation. Also, since the cleaning mechanism is activated at the time of connecting a power supply for recording and/or reproducing, the head can be cleaned during a lengthy recording operation. Further, the cleaning mechanism is operated at the time of power cut-off, thereby permitting the cleaning operation to be performed more frequently than in the prior art. Furthermore, head cleaning during a lengthy recording operation is made possible by the fact that the cleaning mechanism is operated in a time slot not reserved for recording a program. Also, the head can always be kept in good condition in view of the fact that the video signal is recorded after cleaning, the cleaning condition is judged from the reproduced output of the recorded portion to confirm whether the cleaning is sufficient or not, and the cleaning operation is repeated until the condition is satisfactory.

As this invention may be embodied in several forms without departing from the spirit or essential characteristics thereof, the present embodiment is therefore illustrative and not restrictive. Thus, the scope of the invention is defined by the appended claims rather than by the description preceding them, and all modifications that fall within the metes and bounds of the claims, or equivalent metes and bounds thereof, are intended to be embraced by the claims.

What is claimed is:

1. A magnetic recording-reproducing apparatus comprising:
    a head for performing magnetic recording and magnetic reproducing on a recording medium;
    a rotary drum on which said head is mounted;
    a cleaning mechanism movable to be in contact with said rotary drum for cleaning said head;
    cleaning judging means for determining a cleaning condition by recording an object signal on the recording medium with said head for a predetermined length of time and detecting a reproduced object signal, after activation of said cleaning mechanism;
    cleaning control means for activating said cleaning mechanism again when said cleaning judging means determines cleaning to be insufficient;
    operating means for inputting a user's desired number of cleaning operations; and
    number deciding means for determining that a number of cleaning operations performed reaches the user's desired number,
    an alarm being output externally when said cleaning judging means determines cleaning to be insufficient and said number deciding means determines that the user's desired number has been reached.

2. The magnetic recording-reproducing apparatus of claim 1, wherein the recording medium is a digital audio tape and the object signal is an audio signal.

3. The magnetic recording-reproducing apparatus of claim 1, wherein said operating means also inputs a cleaning operation command,
    said cleaning judging means determining a cleaning condition after an initial cleaning operation responsive to the cleaning operation command.

4. The magnetic recording-reproducing apparatus of claim 1, wherein the user's desired number of cleaning operations is a user selected upper limit of cleaning operations.

5. A cleaning control operation for cleaning a head mounted on a rotary drum of a magnetic recording-reproducing apparatus with a cleaning mechanism movable to be in contact with the rotary drum, comprising the steps of:
    a) setting an upper limit of cleaning operations and initiating a cleaning operation, in response to an input command;
    b) activating the cleaning mechanism to perform a cleaning operation of the head;
    c) determining if a number of cleaning operations performed is less than the upper limit of cleaning operations;
    d) generating an alarm signal upon determination in said step c) that the number of cleaning operations is not less than the upper limit of cleaning operations;
    e) determining if cleaning of the head is necessary upon determination in said step c) that the number of cleaning operations is less than the upper limit of cleaning operations;
    f) terminating the cleaning operation upon determination in said step e) that cleaning of the head is not necessary; and
    g) repeating said steps b) through e) upon determination in said step e) that cleaning of the head is necessary.

6. The cleaning control operation of claim 5, wherein said step e) comprises the steps of:
    e1) recording an object signal on a recording medium using the head;
    e2) reproducing the object signal recorded in said step e1);
    e3) determining that cleaning of the head is necessary if a level of the reproduced object signal is less than a predetermined threshold; and
    e4) determining that cleaning of the head is not necessary if the level of the reproduced object signal is not less than the predetermined threshold.

7. The cleaning control operation of claim 6, wherein the recording medium is digital audio tape and said step e1) comprises recording an audio signal on the digital audio tape as the object signal.

8. The cleaning control operation of claim 6, wherein said step e1) comprises recording the object signal on the recording medium for a predetermined length of time.

9. A magnetic recording-reproducing apparatus comprising:
- a head, mounted on a rotary drum, for recording and reproducing signals on a recording medium;
- a cleaning mechanism movable to be in contact with said rotary drum, for cleaning said head;
- an input element for setting a user selected cleaning request and a user selected upper limit of cleaning operations; and
- a controller, responsive to the user selected cleaning request, for performing a cleaning cycle which includes activating said cleaning mechanism to clean said head, generating an alarm signal if the number of cleaning operations performed is not less than the upper limit of cleaning operations and determining if additional cleaning of said head is necessary if the number of cleaning operations performed is less than the upper limit of cleaning operations,
- said controller terminating the cleaning cycle upon determining that additional cleaning of said head is not necessary and repeating the cleaning cycle upon determining that additional cleaning of said head is necessary.

10. The magnetic recording-reproducing apparatus of claim 9, wherein said controller records an object signal on the recording medium using said head and then reproduces the recorded object signal, said controller determining that additional cleaning of said head is necessary if a level of the reproduced object signal is less than a predetermined threshold and determining that additional cleaning of said head is not necessary if the level of the reproduced object signal is not less than the predetermined threshold.

11. The magnetic recording-reproducing apparatus of claim 10, wherein the recording medium is digital audio tape and an audio signal is recorded on the digital audio tape as the object signal.

12. The magnetic recording-reproducing apparatus of claim 10, wherein the object signal is recorded on the recording medium over a predetermined length of time.

* * * * *